July 11, 1950  F. C. BINNALL ET AL  2,515,073
FLOW CONTROL VALVE
Filed Aug. 16, 1946
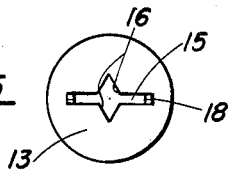
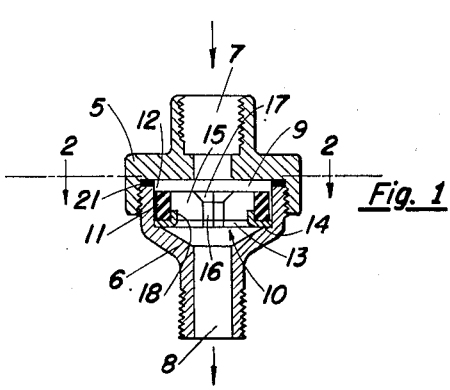
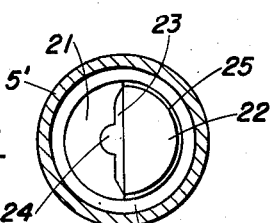
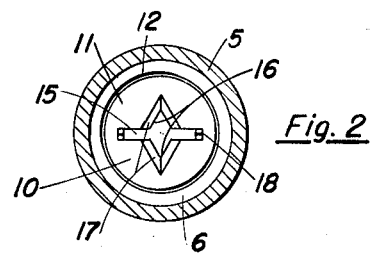
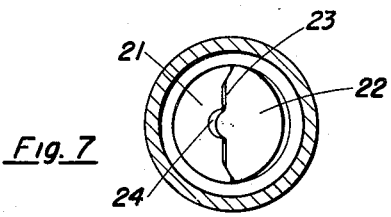
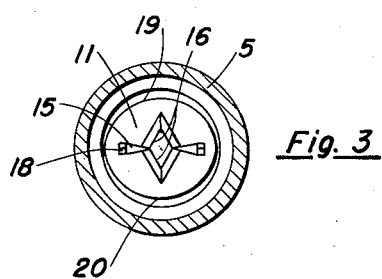
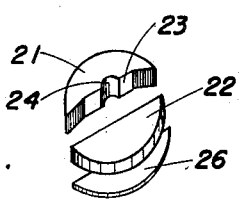
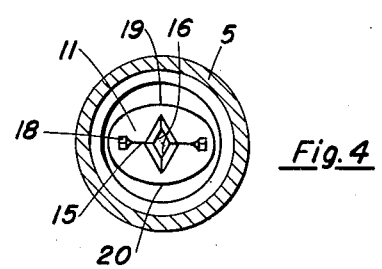
INVENTORS.
FREDERICK C. BINNALL
BY MALCOLM T. MILLER
Parker & Carter
ATTORNEYS Patented July 11, 1950

2,515,073

UNITED STATES PATENT OFFICE 2,515,073

FLOW CONTROL VALVE

Frederick C. Binnall, River Forest, and Malcolm T. Miller, Oak Park, Ill., assignors to Sloan Valve Company, Chicago, Ill., a corporation of Illinois Application August 16, 1946, Serial No. 691,073

8 Claims. (Cl. 138—45)

This invention relates in general to flow control valves for controlling the flow of fluid and the principal object is to provide a new and improved device of this type.

A further object is to provide a fluid flow control valve by means of which a constant rate of flow of fluid is maintained, irrespective of variations in the pressure of the fluid delivered to the valve.

Another object is to provide a flow control device which comprises relatively few simple parts, operates reliably with great accuracy, and is economical in construction.

A still further object is to provide a flow control valve having means therein for automatically varying the cross-sectional area of the passage therethrough in accordance with variations in pressure of the fluid flow.

The foregoing and other objects and advantages not specifically mentioned are accomplished by the novel design, construction, and combination of parts hereinafter described and shown in the accompanying drawings and specifically pointed out in the appended claims.

Referring to the drawings:

Fig. 1 is a sectional side view of a preferred form of the flow control valve showing the position of the device with no fluid flowing therethrough;

Fig. 2 is a sectional view taken along the line 2—2 of Fig. 1;

Fig. 3 is a view similar to Fig. 2 but showing the position of the parts at one stage when fluid is passing through the device;

Fig. 4 is a view showing a further position of the device when the same is subjected to a higher fluid flow pressure;

Fig. 5 is a detail showing of the valve support plate;

Fig. 6 is a view of a modified form of the invention;

Fig. 7 an operated position of the modified flow control device, while

Fig. 8 is a perspective view of the separate elements of the device of Fig. 6.

The broad aspects of the invention are illustrated in Figs. 1 to 5 inclusive, and while the device has not been shown in association with any particular apparatus to which a predetermined rate of liquid flow is to be delivered, it will be appreciated that the controlled flow of liquid may be passed to any type of equipment where such control is necessary or desirable. In the construction shown there is provided a pair of coupling members 5 and 6, having enlarged portions threaded together as shown and arranged with an inlet passage 7 in coupling 5 and an outlet passage 8 in coupling 6. A central chamber 9 is formed between the enlarged portions of couplings 5 and 6, within which a flow control device indicated generally at 10 is positioned. The inlet 7 is connected to a suitable source of fluid supply while the outlet 8 conveys the liquid to the apparatus receiving the controlled rate of flow.

The flow control device 10 includes as one of its essential elements a member 11 constructed of elastic material such as rubber or some rubber substitute and formed in the shape of a disc having an outer diameter slightly less than the outer walls of the chamber 9 as indicated at 12 in Fig. 2. For supporting the disc member 11 within the chamber 9 there is provided a metal plate 13 fitting snug against the walls of the chamber 9 and resting on an annular shoulder 14 formed in the coupling member 6 as shown. The elastic member 11 rests directly upon the metal plate 13 and with this construction shown the flow regulator 10 may be inserted as a capsule or unit into the chamber 9. The elastic member 11 and its supporting plate 13 both have aligned openings 15 passing therethrough which openings are in the form of a slot extending from opposite sides of the center to a point close to the outside diameter of the members. This slot 15 is further cut with oppositely disposed V-notches 16 to provide a larger normal opening through the flow regulator at its mid-point. Particular attention is called to the fact that the edges of the slot 15 in both the elastic member 11 and the supporting plate 13 are in direct alignment with each other so that no protruding portion of the elastic member 11 will overlap the slot in the supporting plate 13. The notches 16 are preferably slightly beveled as indicated at 17 on the top or upstream side of the elastic member 11.

In order that no relative axial rotation or movement take place between the support plate 13 and the elastic member 11, which would place the associated slots 15 out of alignment with each other, the extreme ends of slot 15 in the support plate 13 are provided with tapered turned up projections 18. These projections 18 extend upward slightly into the bottom of the slot in the elastic member 11 without, however, interfering with its proper operation, as will be explained hereinafter.

The elastic member 11 is so constructed and arranged within the chamber 9 that incoming fluid pressure exerted in the chamber 9 and acting upon the external cylindrical surface of the member compresses it circumferentially inwardly from two opposite sides 19 and 20 into an eliptical shape as shown in Fig. 3. This action is brought about because of the greater difference in area of the outer circumferential portion of the elastic member 11 as compared to the area of the wall of the slot 15, and the greater the fluid pressure in chamber 9, the more closely the walls of the slot 15 approach each other until they finally contact and any greater pressures then also compress the V-notches 16 further reducing the effective area of the fluid passageway through the device. The distortion of the material of the member 11 upon which the pressure of the fluid is applied causes the effective area of the opening through the device to be increased as the pressure is reduced and decreased as the pressure rises. The effective area of the opening is thus automatically varied by the fluid pressure delivered to the device so as to maintain a constant rate of fluid flow at the outlet end of the device irrespective of the pressure of the delivered fluid.

The use and operation of the invention will now be pointed out. In assembling the device the elastic member 11 is placed on top of the support plate 13 with the ears 18 registering with the slot 15 in the elastic member. This unit is then inserted in coupling 6 so the support plate 13 rests on the shoulder 14. The coupling 5 is then screwed in the coupling 6 and a sealing gasket 21 may be interposed as shown. It will be noted in the assembly that the space in the top of chamber 9 is less than the total height of elastic member 11; this is to insure that the elastic member 11 cannot be axially displaced from the ears 18 and render the device inoperative. A pipe leading to a source of fluid supply which may be of variable pressures is connected to the inlet 7 while the outlet 8 leads to the device receiving the controlled flow.

Fluid flow through the device exerts pressure on the top side and around the circumference of the elastic member 11 but not on the surface which is resting on support plate 13 and in the slot 15 where a pressure drop occurs. The pressure on the top or face of the elastic member holds or forces it against the support plate 13. The relative differences in area between the circumference of the elastic member and the walls of slot 15 causes a difference in pressure to be present and results in compressing the elastic disc inward, decreasing the cross-sectional area of the slot 15 and therefore decreasing the fluid flow therethrough. The surface of the eleastic member in contact with its support plate 13 has an inward sliding action therewith as the pressure rises. By proper selection of the size and shape of the slot 15, the size and shape of elastic disc 11, and the elasticity of the rubber, the action will be such that an equal amount of fluid will flow through the device regardless of the pressure drop across the device.

According to the present invention the length and width of the slot 15 is so selected that the action of the flow device occurs in several stages, that is at fluid pressures from zero to about ten pounds p. s. i., for example, the edges of the notches 16 contact as shown in Fig. 3 and at pressure of ten pounds and above the whole length of the sides of the slot contact with each other. After the slot 15 is entirely closed greater pressures will further compress the circumference of the elastic member and gradually reduce the size of the diamond-shaped opening. At all the stages the size of the opening through the device is varied inversely as the pressure of the fluid delivered varies, thereby maintaining a constant rate of fluid deivery from the device regardless of variations in the pressure of the incoming fluid. By causing the elastic member to control the size of the opening in various stages, particularly at lower pressure conditions, a more reliable, stable and controlled rate of fluid flow at the output is made possible, than if a single round opening were provided in which the area of the opening would be difficult to control at low pressures and high pressures as well.

In other words, the particular shape of the slot and notches in the elastic member are such that there is a much larger effective discharge opening for low inlet pressures than for high pressures. Therefore it is necessary to have a considerably greater movement per unit of pressure change at the lower inlet pressures than per unit of pressure change at the higher inlet pressures, the larger effective area of the slot controlling at low pressures while the notches forming the diamond-shaped outlet control at the higher pressures.

Referring now to the modification of the invention illustrated in Figs. 6 to 8, this control device may be similarly arranged and supported in coupling members such as the ones in the device of Fig. 1. It comprises two separate members 21 and 22 arranged side-by-side with each formed into a half-moon shape, the member 21 being made of metal and the member 22 being preferably of rubber or the like material. The metal member 21 is formed with a longitudinal recess 23 and a notch 24 cut at its midpoint both forming an orifice for fluid flow in cooperation with the straight side wall of the rubber member 22. The rubber member 22 fits rather loosely in the couplings as indicated at 25 while the member 21 fits snugly therein. A support plate 26, see Fig. 8, serves to carry the rubber member 22 in the casing and confines the compression action on the rubber member to a sliding movement with respect to support 26. The operation of the flow control device of Fig. 6 is somewhat similar to the device of Fig. 1, fluid pressure however being exerted only on the upper side and outer circumference of rubber member 22 to compress the member inward towards the irregular surfaces of metal member 21 by a series of predetermined stages depending on the fluid pressures exerted. On the first stage the slot 23 is closed leaving the opening 24 effective to pass the fluid flow as shown at Fig. 7 and as the pressure increases this opening 24 in turn gradually decreases. The distorted rubber member 22 is so compressed that its outer circumference gradually moves further away from the inner surface of the coupling member. Under all fluid pressures for which the device is adapted the rate of fluid flow delivered will always be constant or of equal amounts in equal periods of time.

While the various forms of embodiment of the invention as herein disclosed constitute preferred forms, it is to be understood that other forms made by those skilled in the art might be adopted without, however, departing from the spirit of the invention, but all coming within the scope of the appended claims.

What is claimed is:

1. In a flow control valve, a casing having a passageway therethrough, a disc-shaped elastic member arranged across said passageway, said elastic member having a lateral slot therein of a length less than the diameter of said elastic member, said elastic member adapted to be distorted circumferentially from its outer edge into an elliptical shape responsive to fluid pressure conditions present at the inlet side of said passageway, whereby the side walls of said lateral slot are variably forced together in accordance with the variations in fluid pressure applied up to a particular value, and so that a constant rate of fluid flow is maintained at the outlet of said passageway, said elastic member also being provided with oppositely disposed notches cut in the slot walls at the center of said elastic member which are effective to maintain a constant rate of flow after the walls of the lateral slot are compressed together and a higher value of fluid pressure is applied.

2. In a flow control device comprising a casing having a passageway therethrough, a disc-shaped elastic member arranged across said passageway, said elastic member having a lateral slot therein of a length less than the mean diameter of said elastic member and oppositely disposed notches in the side walls of said lateral slot at the midpoint of said elastic member, said elastic member adapted to be compressed laterally and circumferentially from opposite sides of its outer edge responsive to fluid pressure applied at the inlet side of said passageway, the compression of said elastic member resulting in its assuming an elliptical shape with the side walls of the lateral slot being forced into gradual engagement as the fluid pressure builds up until a certain fluid pressure value is reached whereupon the lateral slot is completely closed, the oppositely disposed notches in the lateral slot being subsequently compressed at fluid pressures having a higher value, the variations in the cross-sectional area of the lateral slot and notches in response to variations in inlet fluid pressures being effective to maintain a constant rate of fluid flow at the outlet side of said device.

3. In a fluid flow control device for automatically maintaining a constant rate of fluid flow at an outlet in response to variations in inlet fluid pressures, a disc-shaped elastic member adapted to be compressed circumferentially to an elliptical shape response to said fluid pressures, said elastic member having a lateral slot therein which is closed at a particular fluid pressure value, and notches on the side walls of said lateral slot effective to control the fluid flow rate at a higher fluid pressure value after said lateral slot is closed.

4. In a fluid flow control device for automatically maintaining a constant rate of fluid flow at an outlet in response to variations in inlet fluid pressures, a disc-shaped elastic member adapted to be compressed circumferentially into an elliptical shape responsive to said fluid pressures, said elastic member having a lateral slot therein which is closed at a particular fluid pressure value, and notches on the side walls of said lateral slot effective to control the fluid flow rate at a higher fluid pressure value after said lateral slot is closed, and a support plate for said elastic member having a lateral slot and notches therein coinciding with the slot and notches in said elastic member, said elastic member having a sliding action with respect to said support plate as the elastic member is being compressed.

5. In a fluid control device for automatically maintaining a constant rate of fluid flow at the outlet of the device in response to variations in inlet fluid pressures, an elastic member having a slot therein and notches on opposite sides of said slot, said elastic member adapted to be compressed by fluid pressures exerted circumferentially to progressively close said slot and notches in response to progressively increased inlet fluid pressures whereby a constant rate of fluid flow is maintained regardless of fluid pressure variations, said slot permitting greater compressive movement of said elastic member per unit pressure change at the lower pressures when the flow is through the relatively large discharge area afforded by the slot, and said notches permitting less compressive movement of said elastic member after said slot is closed and higher fluid pressures are encountered.

6. In a fluid flow control unit, a slotted plate of substantially rigid material and a slotted body of elastic material overlying said plate, the slots in said body and plate being of like shape, the body of elastic material being formed and adapted automatically to vary the cross sectional area of the passageway formed by said slots, in response to variations in fluid pressure to which said control unit is subjected, said plate and body having interpenetrating portions adapted to prevent their relative rotation, and to keep their slots in register.

7. In a fluid flow control unit, a slotted plate of substantially rigid material and a slotted body of elastic material overlying said plate, the slots in said body and plate being of like shape, the body of elastic material being formed and adapted automatically to vary the cross sectional area of the passageway formed by said slots, in response to variations in fluid pressure to which said control unit is subjected, said slots having one or more lateral enlargements intermediate their ends.

8. In a fluid flow control unit, means including a plate of substantially rigid material, for defining a slot having a lateral enlargement intermediate its ends, and a body of elastic material having an edge extending along and conforming to an edge of said slot, said body being formed and adapted, in response to variations in the fluid flow pressure to which it is subjected, progressively to vary the effective area of the passage provided by said slot.

FREDERICK C. BINNALL.
MALCOLM T. MILLER.

REFERENCES CITED

The following references are of record in the file of this patent:

UNITED STATES PATENTS

| Number | Name | Date |
|---|---|---|
| 2,025,247 | Rosenberger | Dec. 24, 1935 |
| 2,389,134 | Brown | Nov. 20, 1945 |
| 2,454,929 | Kempton | Nov. 30, 1948 |

FOREIGN PATENTS

| Number | Country | Date |
|---|---|---|
| 372,286 | Great Britain | May 2, 1932 |